United States Patent
Sasaki et al.

(10) Patent No.: US 6,422,484 B1
(45) Date of Patent: Jul. 23, 2002

(54) SHOWER APPARATUS

(75) Inventors: Tsutomu Sasaki; Satoshi Sasaki, both of Kyoto; Atsushi Hatakeyama, Tokyo, all of (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/634,792

(22) Filed: Aug. 9, 2000

Related U.S. Application Data

(63) Continuation of application No. PCT/JP99/00521, filed on Feb. 8, 1999.

(30) Foreign Application Priority Data

Feb. 9, 1998 (JP) ............................................ 10-044368

(51) Int. Cl.⁷ .............................. A62C 5/02; B05B 1/14; B05B 9/08; B05B 15/06
(52) U.S. Cl. ....................... 239/310; 239/553; 239/282; 239/530
(58) Field of Search ............................ 4/605, 615, 597; 239/282, 283, 553, 575, 462, 588, 530, 590, 531, 590.3, 310, DIG. 23; 210/264, 266

(56) References Cited

U.S. PATENT DOCUMENTS

| | | | | |
|---|---|---|---|---|
| 1,724,147 A | * | 8/1929 | Russell | 239/283 |
| 4,242,201 A | * | 12/1980 | Stephens et al. | 4/615 |
| 4,360,159 A | * | 11/1982 | Haynes | 4/605 |
| 4,914,759 A | * | 4/1990 | Goff | 4/605 |
| 5,070,553 A | * | 12/1991 | Chambers | 4/605 |
| 5,213,688 A | * | 5/1993 | Robinson | 4/605 |
| 5,220,697 A | * | 6/1993 | Birchfield | 4/605 |
| 5,545,314 A | * | 8/1996 | Parise et al. | 210/100 |
| 5,855,348 A | * | 1/1999 | Fornara | 248/291.1 |
| 6,096,197 A | * | 8/2000 | Hughes | 4/615 |

* cited by examiner

*Primary Examiner*—William C. Doerrler
*Assistant Examiner*—Davis Hwu
(74) *Attorney, Agent, or Firm*—Akin, Gump, Strauss, Hauer & Feld, L.L.P.

(57) ABSTRACT

A hollow bar is provided in a bathroom and connected with a faucet 10 and a showerhead 1. The hollow bar comprises a slide bar 3 for the hook 2 of the showerhead or a grip bar 15 for a user. Water treating material such as a filter medium, ion exchange resin and ceramics is placed in the hollow bar and water jetted from the faucet 10 passes the water treating material in the hollow bar. The water is treated by the water treating material and the treated water is guided to and dispensed from the showerhead.

2 Claims, 5 Drawing Sheets

SHOWER APPARATUS

CROSS REFERENCE TO RELATED APPLICATION

This application is a continuation of International Application PCT/JP99/00521, filed Feb. 8, 1999, the disclosure of which is incorporated herein by reference.

BACKGROUND OF THE INVENTION

The invention relates to a shower apparatus including a shower head from which water is discharged in a bathroom.

It is recently required in a shower apparatus including a shower head from which water is discharged in a bathroom that the water is filtrated and purified by a filter medium such as granular activated carbon, activated carbon fiber or hollow fiber. The water is usually warm to have a temperature of 38 to 45° C. However, a purifier involves a problem of cost for manufacturing. In addition, it has to be disposed in the bathroom to involve a problem of space in the bathroom.

It is also required in the shower apparatus that the water is changed into a soft or hard water by an ion-exchange resin. Further, it is required that the water is modified by ceramics. However, the needful apparatus involves a problem of cost for manufacturing. It has to be disposed in the bathroom to involve a problem of space in the bathroom.

BRIEF SUMMARY OF THE INVENTION

Accordingly, an object of the invention is to provide a shower apparatus including a shower head from which water is discharged in a bathroom, in which the water can be treated by a water treatment material such as filter medium, ion-exchange resin or ceramics and then discharged from the shower head, without the problem of cost and without the problem of space.

According to the invention, a hollow bar is provided in a bathroom and is connected to a faucet pipe and a shower head. The hollow bar comprises a slide bar for the hook of the shower head or a grasp bar provided on the wall of the bathroom for a user. A water treatment material such as filter medium, ion-exchange resin or ceramics is received in the hollow bar and water is discharged from the faucet pipe to pass through the water treatment material in the hollow bar so that the water is treated by the water treatment material. The treated water is directed to and discharged from the shower head.

The water may be warm to have a temperature of 38 to 45° C.

The faucet pipe may be connected to one end portion of the hollow bar, while the shower head is connected to the other end portion of the hollow bar. Alternatively, the faucet pipe and the shower head may be connected to the same end portion of the hollow bar.

The water treatment material may be received in a cartridge which is inserted in the hollow bar. The cartridge may be cylindrical or rectangular to have an axial bore formed therethrough.

A plurality of cartridges may be arranged in series so that the axial bores therein are communicated with each other in the hollow bar. An annular clearance may be formed between the circumferential wall of the hollow bar and the cartridges. The water is directed to the annular clearance and the water then passes through the water treatment material in the cartridges to be directed to the axial bores so that the water is treated by the water treatment material in the cartridges. By contraries, the water may be directed to the annular bores. The water then passes through the water treatment material in the cartridges to be directed to the annular clearance so that the water is treated by the water treatment material in the cartridges.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
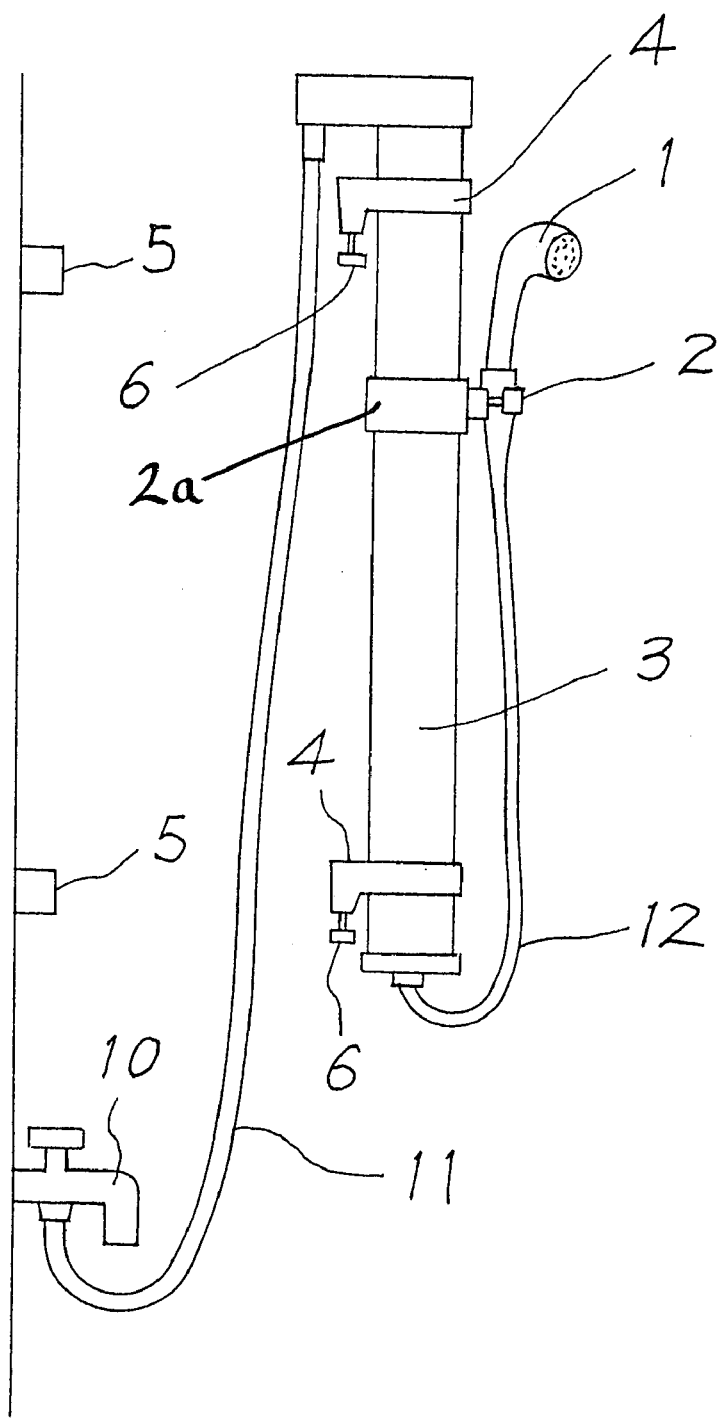
FIG. 1 is a side view of an embodiment according to the invention.

Referring to FIG. 1, there is illustrated a shower apparatus including a shower head 1 from which water is discharged. The water is warm to have a temperature of 38 to 45° C. An elongated hollow bar is provided in a bathroom. The hollow bar comprises a slide bar 3 for the hook 2 of the shower head 1.

The hook 2 is mounted on the slide bar 3 with a bar 2a for sliding movement, so that the shower head 1 can be engaged with and supported by the hook 2 and the bar 2a. The slide bar 3 extends vertically. A pair of upper and lower adapters 4 are mounted on the outer surface of the slide bar 3. The adapters 4 are intended to be engaged with hooks 5 provided on the wall of the bathroom. The adapters 4 are fixed by screws 6, so that the slide bar 3 can be mounted and supported by the adapters 4 and the hooks 5. Accordingly, the hook 2, bar 2a and the shower head 1 can be slidingly moved along an external surface of the slide bar 3 for adjustment of height. The hooks 5 are existing ones usually utilized for a shower head engaged therewith.

Figure 2:
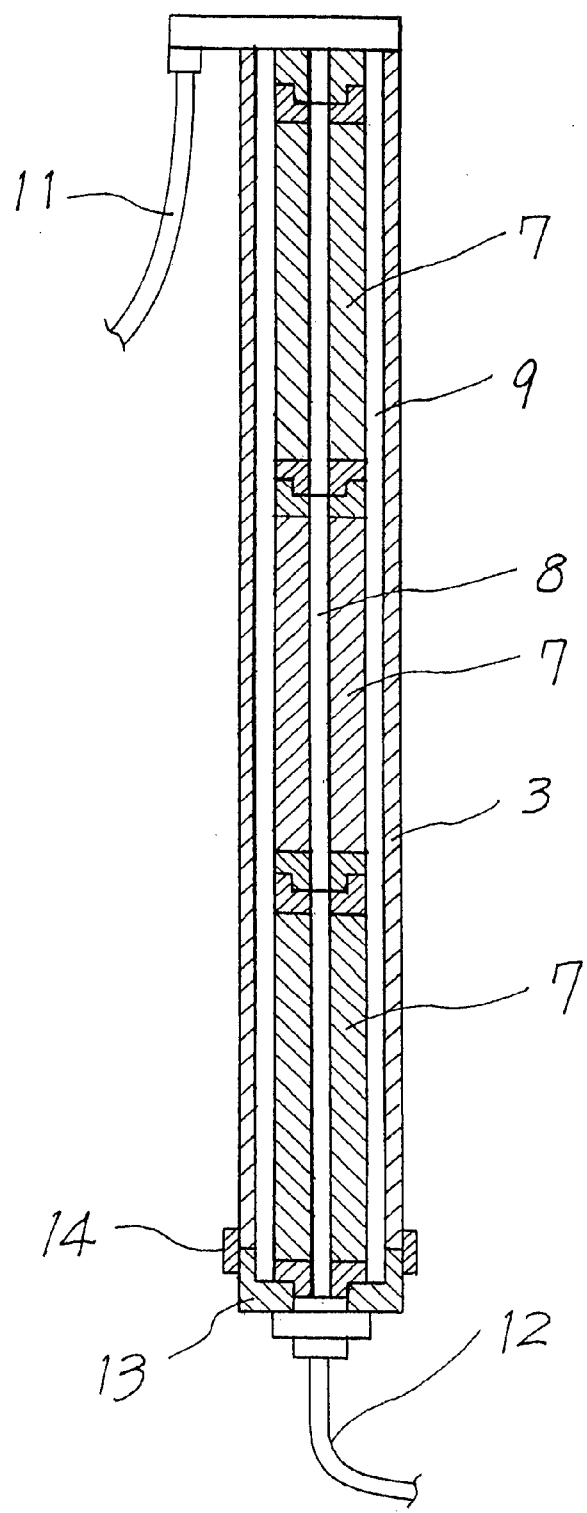
FIG. 2 is a sectional view of the slide bar of FIG. 1.

Further, a filter medium such as granular activated carbon, activated carbon fiber or hollow fiber is received in the slide bar 3. In the embodiment, the filter medium is received in a cartridge 7 which is inserted in the slide bar 3, as shown in FIG. 2. The cartridge 7 is elongated and cylindrical to have an axial bore 8 formed therethrough. In addition, the slide bar 3 includes a plurality of cartridges 7 which are received therein and arranged in series so that the axial bores 8 therein are communicated with each other. An annular clearance 9 is formed between the circumferential wall of the slide bar 3 and the cartridges 7.

The slide bar 3 is connected to a faucet pipe 10 and the shower head 1. In the embodiment, the faucet pipe 10 is connected to one end portion of the slide bar 3, while the shower head 1 is connected to the other end portion of the slide bar 3. For example, there are utilized a flexible hose 11 connected to the faucet pipe 10 and a flexible hose 12 connected to the shower head 1. The flexible hose 11 is connected to the upper end portion of the slide bar 3, while the flexible hose 12 is connected to the lower end portion of the slide bar 3, so that the faucet pipe 10 is connected to the upper end portion of the slide bar 3 and the shower head 1 is connected to the lower end portion of the slide bar 3.

As to the hose 12 for the shower head 1, the lower end portion of the slide bar 3 is closed by a cap 13. A ring 14 is threadably engaged with the cap 13 so that the cap 13 and the slide bar 3 are coupled with each other by the ring 14. The hose 12 is coupled with the cap 13 of the slide bar 3 to be connected to the lower end portion of the slide bar 3. The ring 14 can be disengaged from the cap 13 for removal of the cap 13 to take out the cartridges 7 from the lower end portion of the slide bar 3 for exchange. Alternatively, the slide bar 3 may be arranged to take out the cartridges 7 from the upper end portion of the slide bar 3 for exchange.

Accordingly, in the apparatus, water is discharged from the faucet pipe 10 and directed to the upper end portion of the slide bar 3 through the flexible hose 11. The water is then directed to the annular clearance 9 in the slide bar 3 to flow axially adjacent to the cartridges 7 into the axial positions of the cartridges 7. The water then flows radially with respect to the cartridges 7 and passes through the filter medium therein to be directed to the axially bores 8. The water is, therefore, filtrated and purified by the filter medium in each of the cartridges 7. The purified water is directed to the lower end portion of the slide bar 3 through the axial bores 8 in the cartridges 7. The purified water is then directed to and discharged from the shower head 1 through the flexible hose 12. It should, therefore, be understood in the apparatus that the cartridges 7 are arranged in series and used in parallel.

In the apparatus, it is merely required to insert the cartridges 7 in the slide bar 3, connect the faucet pipe 10 to one end portion of the slide bar 3 and connect the shower head 1 to the other end portion of the slide bar 3. There is no need to manufacture a purifier, to overcome the problem of cost. The purifier may be disposed in the bathroom, to overcome the problem of space in the bathroom.

In addition, the cartridge 7 is elongated and cylindrical to have a relatively small radius in the apparatus. The filter medium is therefore hardly clogged by the water flowing radially of the cartridge 7 to pass through the filter medium therein so that the water is purified by the filter medium.

As to the filtrability of the apparatus, there is a relationship between the filtrability and the area of outer surface of the filter medium in the cartridge 7. The filtrability is determined by the area of outer surface of the filter medium. The larger the area of outer surface of the filter medium, the greater the filtrability. In this connection, the plurality of the cartridges 7 are inserted in the slide bar 3 and arranged in series in the apparatus to thereby increase the effective axial length of cartridge. This can increase the area of outer surface of the filter medium to improve the filtrability of the apparatus even if the cartridge 7 has a relatively small radius.

In addition, the plurality of the cartridges 7 not only increase the effective axial length of cartridge but also increase the ratio of axial length to radius of the filter medium. This remarkably increases the ratio of area of outer surface to volume of the filter medium and remarkably improves the filtrability, thereby improving efficiency.

Figure 3:
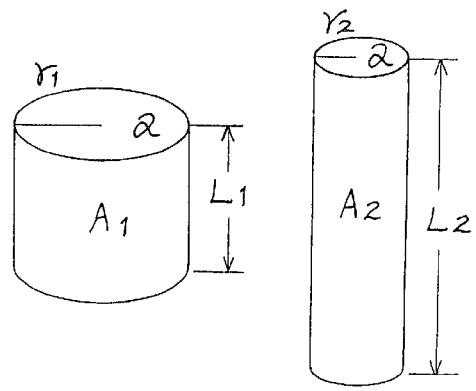
FIG. 3 is an explanatory view of the filter medium of FIG. 2.

For example, in two filter mediums having the same volume Q, one of the filter mediums has a radius $r_1$, an axial length $L_1$ and an area $A_1$ of outer surface, while the other filter medium havs a radius $r_2$, an axial length $L_2$ and an area $A_2$ of outer surface, as shown in FIG. 3. If the radius $r_2$ is half of the radius $r_1$, the volume Q is calculated for each of the filter mediums by following formulas:

$$Q = \pi r_1^2 \times L_1$$

$$Q = \pi r_2^2 \times L_2 = \pi (r_1/2)^2 \times L_2$$

$$= (1/4) \times \pi r_1^2 \times L_2$$

The axial length $L_2$ is therefore 4 times of the axial length $L_1$.

$$\pi r_1^2 \times L_1 = (1/4) \times \pi r_1^2 \times L_2$$

$$L_1 = (1/4) L_2$$

$$L_2 = 4 L_1$$

The area $A_1$ of outer surface is calculated for one of the filter mediums by the following formula:

$$A_1 = 2\pi r_1 \times L_1$$

The area $A_2$ of outer surface is calculated for the other filter medium by the following formula to be twice of the area $A_1$ of outer surface of one of the filter mediums.

$$A_2 = 2\pi r_2 \times L_2 = 2\pi (r_1/2) \times 4 L_1$$

$$= 4\pi r_1 \times L_1 = 2 A_1$$

Accordingly, the apparatus can increase the ratio of axial length $L_2$ to radius $r_2$ of the filter medium to remarkably increase the ratio of area $A_2$ of outer surface to volume $Q_2$ of the filter medium, thereby remarkably improving the filtrability.

In addition, as to the cartridges 7 in the apparatus, the cartridge 7 may be relatively short. That is, the cartridges 7 do not need to be extremely long. If the cartridges 7 are relatively short, the plurality of cartridges 7 can increase the effective overall axial length of cartridge in the slide bar 3. The cartridges 7 can, therefore, be stored and transferred easily.

Figure 4:
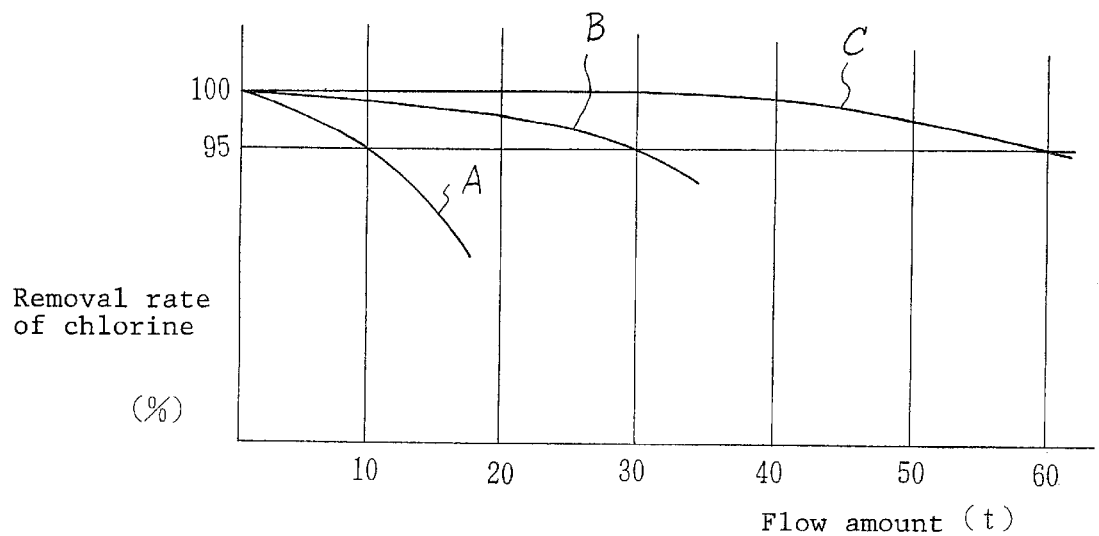
FIG. 4 is a graph showing a test result of filtrability of the apparatus of FIG. 1.

FIG. 4 shows a test result of filtrability of the apparatus. In the test, water was made to flow at an amount of 10 l per minute in a pipe having a diameter. A cartridge 7 was inserted in the pipe and the water was filtrated to remove chlorine by the filter medium in the pipe. In the test, removal rate of chlorine initially reached 100% but reduced into 95% when the total amount of water reached 10 t, as shown by curve A. In the next test, two cartridges 7 were arranged in series and connected to each other in the pipe. In the second test, the total amount of water reached 30 t when the removal rate of chlorine reduced into 95%, as shown by curve B. Further in a third test, three cartridges 7 were arranged in series and connected to each other and the total amount of water reached 60 t when the removal rate of chlorine reduced into 95%. It was therefore determined that the filtrability increases acceleratively in accordance with the increase in number of the cartridges 7.

The slide bar 3 may be removed from the hook 5 when taking out the cartridges 7 from the slide bar 3 for exchange.

It is not always necessary to connect the faucet pipe 10 to the upper end portion of the slide bar 3 and the shower head 1 to the lower end portion of the slide bar 3. By contraries, the faucet pipe 10 and the flexible hose 11 may be connected to the lower end portion of the slide bar 3, while the shower head 1 and the flexible hose 12 are connected to the upper end portion of the slide bar 3. The water discharged from the faucet pipe 10 passes through the filter medium in the cartridges 7 so that the water is purified by the filter medium in the cartridges 7 and the purified water is directed to and discharged from the shower head 1.

Figure 5:
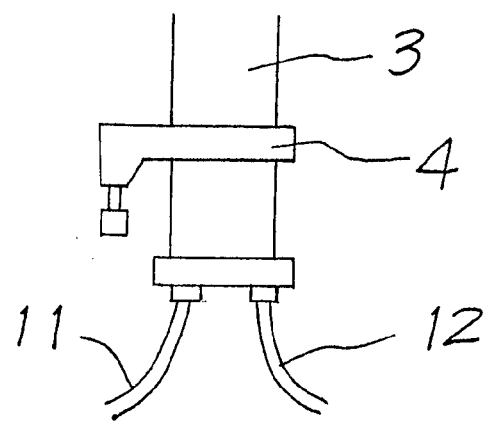
FIG. 5 is a side view of another embodiment.
Figure 6:
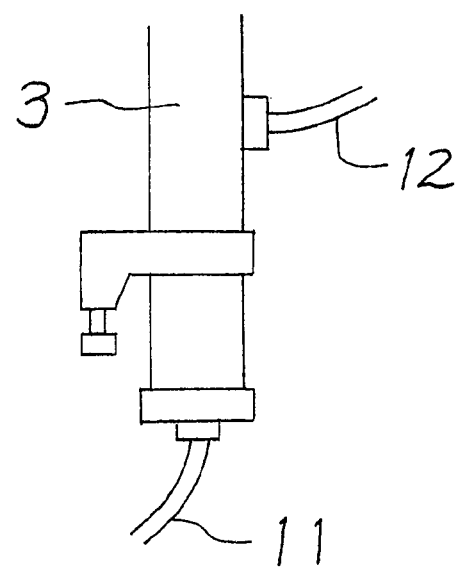
FIG. 6 is a side view of other embodiment.

The faucet pipe 10 and the shower head 1 may be connected to the same end portion of the slide bar 3. For example, the faucet pipe 10 and the flexible hose 11 may be connected to the lower end portion of the slide bar 3, while the shower head 1 and the hose 12 are also connected to the lower end portion of the slide bar 3, as shown in FIG. 5. The water is discharged from the faucet pipe 10 to pass through the filter medium in the cartridges 7 so that the water is purified by the filter medium in the cartridges 7. The purified water is then directed to and discharged from the shower head 1. By contraries, the faucet pipe 10 and the shower head 1 may be connected to the upper end portion of the slide bar 3. The shower head 1 may also be connected to the intermediate portion of the slide bar 3, as shown in FIG. 6. The faucet pipe 10 and the flexible hose 11 may alternatively be connected to the intermediate portion of the slide bar 3.

The faucet pipe 10 is generally disposed in a relatively low position. It is therefore preferable that the faucet pipe 10 and the flexible hose 11 are connected to the lower end portion of the slide bar 3 so that the flexible hose 11 can be short, less costly, and economical. It is also preferable that the shower head 1 and the hose 12 are connected to the lower end portion of the slide bar 3 to be useful.

Figure 7:
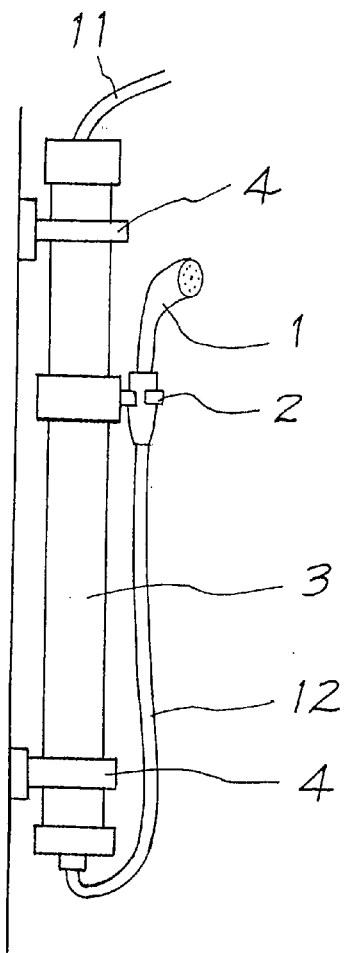
FIG. 7 is a side view of other embodiment.

The adapter 4 of the slide bar 3 may be directly mounted on the wall of the bathroom, as shown in FIG. 7.

The hook 2 may be mounted on a slide bar which extends horizontally, for sliding movement, so that the hook 2 and the shower head 1 can be moved along the slide bar for adjustment of position. In such a slide bar, the cartridges 7 of FIG. 2 may be inserted in the slide bar so that the water can be discharged from the faucet pipe 10 to pass through the filter medium in the cartridges 7. The water is filtrated and purified by the filter medium in the cartridges 7 and then directed to and discharged from the shower head 1.

Figure 8:
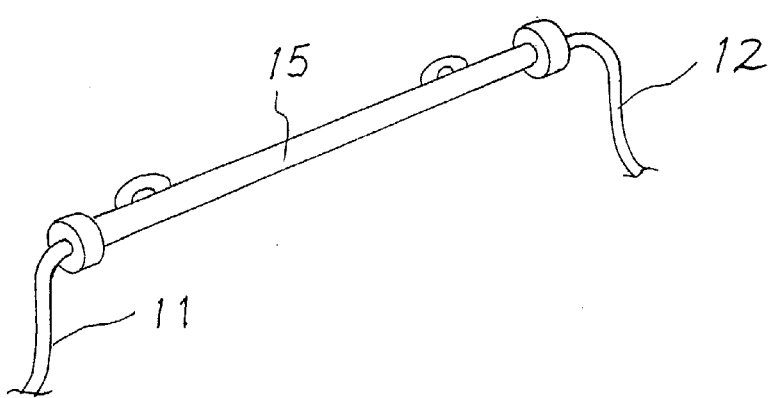
FIG. 8 is a perspective view of other embodiment.

In another embodiment of FIG. 8, the hollow bar comprises a grasp bar provided on the wall of the bathroom for a user. The cartridges 7 of FIG. 2 are inserted in the grasp bar 15 so that the filter medium is received in the grasp bar 15. The faucet pipe 10 and the flexible hose 11 are connected to one end portion of the grasp bar 15. The shower head 1 and the flexible hose 12 are connected to the other end portion of the grasp bar 15. In addition, the plurality of cartridges 7 are arranged in series such that the axial bores 8 thereof communicate with each other. An annular clearance 9 is formed between the circumferential wall of the slide bar 3 and the cartridges 7. Accordingly, water is discharged from the faucet pipe 10 to pass through the filter medium of the cartridges 7 so that the water is filtrated and purified by the filter medium of the cartridges 7. The purified water is directed to and discharged from the shower head 1. The faucet pipe 10 and the shower head 1 may be connected to the same end portion of the grasp bar 15, as in the embodiment of FIG. 5. The faucet pipe 10 and the shower head 1 may be connected to the intermediate portion of the grasp bar 15.

It is not always necessary that the cartridges 7 are cylindrical. The cartridges may be rectangular which are inserted in the slide bar 3 or the grasp bar 15 and arranged in series.

Ion-exchange resin may be received in the slide bar 3 or the grasp bar 15 so that the water can be changed into a soft or hard water by the ion-exchange resin. Ceramics may be received in the slide bar 3 or the grasp bar 15 so that the water can be modified by the ceramics. The ion-exchange resin or the ceramics may be received in a cartridge inserted in the slide bar 3 or the grasp bar 15.

As described above, water can be treated by a water treatment material such as filter medium, ion-exchange resin or ceramics and then discharged from the shower head 1, according to the invention. In addition, it is merely required to receive the water treatment material in a slide bar 3 or a grasp bar 15 and connect the slide bar 3 or the grasp bar 15 to a faucet pipe 10 and a shower head 1. There is no need to manufacture a purifier, to overcome the problem of cost. The purifier does not need to be disposed in the bathroom, to overcome the problem of space in the bathroom.

It is also intended that the water treatment material is received in an elongated cartridge 7 which is inserted in the slide bar 3 or the grasp bar 15. In the case, the water treatment material is hardly clogged when the water is treated by the water treatment material in the cartridge 7. The plurality of cartridges 7 can increase the effective axial length of cartridge to increase the area of outer surface of the water treatment material, improving the filtrability. It can also increase the ratio of area of outer surface to volume of the water treatment material to remarkably improve the filtrability. In addition, the cartridge 7 may be relatively short. The cartridge does not need to be extremely long. It can, therefore, be stored and transferred easily.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A shower apparatus comprising a hollow bar provided in a bathroom and connected to a faucet pipe and a shower head; said hollow bar comprising a slide bar for a hook of the shower head or a grasp bar provided on a wall of the bathroom for user, the hook of the shower head being slideably mounted on an external surface of said hollow bar and a water treatment material such as filter medium, ion-exchange resin or ceramics received in a cartridge that is cylindrical or rectangular to have an axial bore therethrough which is inserted in said hollow bar, a plurality of cartridges are arranged in series so that the axial bores therein are communicated with each other in said hollow bar, wherein an annular clearance being formed between the circumferential wall of said hollow bar and said cartridges, said water being directed from said faucet pipe to said annular clearance, said water then passing through said water treatment material in said cartridges to be directed to said axial bores so that said water is treated by said water treatment material in said cartridges, the treated water being directed to and discharged from said shower head.

2. A shower apparatus comprising a hollow bar provided in a bathroom and connected to a faucet pipe and a shower head; said hollow bar comprising a slide bar for a hook of the shower head or a grasp bar provided on a wall of the bathroom for user, the hook of the shower head being slideably mounted on an external surface of said hollow bar and a water treatment material such as filter medium, ion-exchange resin or ceramics received in a cartridge that is cylindrical or rectangular to have an axial bore therethrough which is inserted in said hollow bar, wherein a plurality of cartridges are arranged in series to have the axial bores communicated with each other in said hollow bar, an annular clearance being formed between the circumferential wall of said hollow bar and said cartridges, said water being directed from said faucet pipe to said annular bores, said water then passing through said water treatment material in said cartridges to be directed to said annular clearance so that said water is treated by said water treatment material in said cartridges, the treated water being directed to and discharged from said shower head.

* * * * *